United States Patent Office 2,773,783
Patented Dec. 11, 1956

2,773,783

PRODUCTION OF WELL DRILLING STARCHES

Klaus Linstroth, Houston, Tex., assignor to National Lead Company, New York, N. Y., a corporation of New Jersey No Drawing. Application April 1, 1952, Serial No. 279,967

3 Claims. (Cl. 127—32)

This invention relates to the production of starch and starchy flour products which are dispersible in drilling muds used in the drilling of oil and gas wells by the rotary method, and more particularly relates to an improved manner of producing the products as well as the products themselves.

In the drilling of oil and gas wells by the rotary method, a circulating fluid usually comprising water and clay, and sometimes additional weighting material such as ground barite, is circulated down the drill pipe whence it issues through holes in the bit and rises in the annular space between the drill pipe and the wall of the hole. Circulation is maintained continuously during the drilling of a well and the circulating fluid serves to remove the cuttings so that drilling can proceed uninterruptedly. The drilling fluid serves several functions, one of which is to retain fluids such as oil, gas and salt water in the formations drilled through, and to keep them confined to their respective formations. In order that a drilling fluid may function properly, it must possess a minimum ability to be filtered, and this lack of filterability has often been characterized as the most important single characteristic of a drilling mud or fluid. If the filtration of a mud is high, a filter cake builds up on the walls of the hole and soon reduces the effective diameter to the point where the drill pipe and bit may become stuck. Furthermore, release of mud filtrate to formations often brings about caving and sloughing, further impeding drilling.

In recent years the use of starch and starchy flours as a filtration reducing additive to aqueous drilling muds has become widespread. The starch or starchy product is nearly always pregelatinized and moreover usually of the variety known as "thin boiling," these modifications making for ease of addition and superior performance in the mud. Methods of preparing products of this type are set forth in considerable detail in Patent No. 2,417,307, of March 11, 1947. The bulk of the pregelatinized thin boiling starches and starchy flours currently used in the drilling mud industry in the United States is produced by simultaneous cooking and drying on steam heated rolls as described in the aforementioned Patent No. 2,417,307. One of the difficulties, however, in producing drilling mud starch in this fashion is that the starch or the flour tends to stick to the rolls. This of course is by no means an insuperable difficulty, but generally reduces the rate of production from a given roll and makes for higher maintenance costs for resharpening the scraper or doctor blades and resurfacing the rolls themselves.

One of the objects of this invention is to provide a process of preparing pregelatinized starch, and pregelatinized thin boiling starches, on heated rolls with a great reduction in sticking of the product to the metal surface of the roll, whereby production is increased.

Another object of the invention is to provide a process of producing such starches wherein not only is stickiness reduced but the filter loss reducing ability of the starch or flour so produced is even greater than otherwise.

Other objects of the invention will become apparent as the description thereof proceeds.

Generally stated, and in accordance with the illustrated embodiments and examples of this invention, a starch or starchy flour is treated by the addition of a small percentage, from about 0.2 to 2 percent, of urea before or at the time it is subjected to the drying action of the heated rolls, the urea being present in the starch slurry or moist filter cake so that it becomes dissolved in the water in such slurry or moist filter cake. (The percentage of urea thus stated is based on the dry weight of starch or starchy flour.) The urea thus comes in contact with substantially all of the starch, and upon drying will naturally be found intimately and submacroscopically dispersed therethrough. The starch can be, among others, corn starch, potato starch, rice starch, waxy maize starch, waxy sorghum starch, milo starch, wheat starch, tapioca starch, sago starch, and the like; or in place of a refined starch, starchy flour, such as corn flour, waxy maize flour, waxy sorghum flour, tapioca flour, rice flour, potato flour and the like may be used. Mixtures of starches and flours often present commercial and technical advantages, and are not excluded from the scope of this invention; for example, mixtures of corn starch and waxy sorghum flour may be use; or starches and flours may be mixed with each other. Whenever it is desired that the product be thin boiling as well as pregelatinized, and this is indeed the usual case for present day drilling fluid requirements, the starch is treated either before roll processing or during roll processing with a suitable treating agent, such as, for example, a dilute mineral acid such as hydrochloric, an oxidizing agent such as barium peroxide, or others, further examples of which are set forth in U. S. Patent No. 2,417,307.

It has been known for some time that the addition of urea to starch and starchy flours in substantial concentration brings about an increase in starch fluidity, which is to say a decrease in the viscosity of a gelatinized aqueous suspension thereof, and also increases the adhesiveness of the starch or starch product, particularly when used as a glue or paper adhesive. The amount of urea used to bring about this known action is in the general range of 3 to 50 percent of urea, based on the weight of the starch. Examples of this type of addition will be found, for example, in Bauer Patent No. 2,216,179, and Kunze, et al. Patent No. 2,282,364. However, the additions of urea contemplated in the present invention are far below the amounts used to increase adhesiveness and fluidity and it surprisingly turns out that when urea is added in accordance with this invention, in amounts of from about 0.2 percent to 2.0 percent, based on the total weight of the starch, then the fluidity is actually decreased in general, and the stickiness, or adhesiveness, instead of being increased, is sharply reduced, making rapid roll processing possible with a minimum of difficulty. Moreover, an unexpected advantage appears in that as the stickiness is reduced, the filtration reducing ability of the starch, particularly for saline muds, is enhanced. The use of amounts of urea in substantially larger quantities than contemplated by this invention has an adverse effect, and as more and more is added the fluidity again increases, and adhesiveness increases.

Some examples of the employment of this process will now be given. These examples are of actual plant tests, using steel rolls three feet in diameter and seven feet long, of the double type, wherein the starch-water or flour-water mixture is fed into the nip between the rolls, carried through the point of contact of the rolls, dried in less than a full revolution of the rolls, and scraped off with a doctor blade. The tests described were carried out with a steam pressure in the rolls of 150 pounds per square in the gauge, resulting in a roll surface temperature of 340° Fahrenheit. A speed of 3½ R. P. M. was used on each roll.

*Table I*

|  | Javanese Tapioca | | | Corn Flour | |
| --- | --- | --- | --- | --- | --- |
| Test No | 1 | 2 | 3 | 4 | 5 |
| Flour, lbs | 40 | 40 | 40 | 40 | 40 |
| Water, lbs | 50 | 50 | 50 | 50 | 50 |
| Acid, cc | 20 | 15 | 19 | 60 | 60 |
| Type | HCl | HCl | HCl | HCl | HCl |
| Urea, gms | 0 | 250 | 450 | 0 | 250 |
| pH | 4.5 | 4.6 | 4.5 | 4.5 | 4.5 |
| Fluidity | 23 | 15 | 24 | 17 | 12 |
| Filtrate, cc | 6.7 | 5.5 | 5.8 | 9.1 | 7.2 |

*Table II*

|  | Corn Starch | | Waxy Sorghum Starch | |
| --- | --- | --- | --- | --- |
| Test No | 6 | 7 | 8 | 9 |
| Starch, lbs | 40 | 40 | 40 | 40 |
| Water, lbs | 50 | 50 | 50 | 50 |
| Acid, cc | 9 | 7 | 10 | 15 |
| Type | $H_3PO_4$ | $H_3PO_4$ | HCl | HCl |
| Urea, gms | 0 | 50 | 0 | 250 |
| pH | 4.0 | 4.2 | 4.4 | 4.5 |
| Fluidity | 20 | 16.0 | 23 | 18 |
| Filtrate | 8.7 | 8.2 | 7.2 | 6.0 |

In the above tests, the quantities of flour, water and acid shown were mixed together and let stand for an average time of about thirty minutes at room temperature, then the urea, if any, added, and the mixture was then fed at a fairly uniform rate into a set of the rolls as described, the flake product collected and ground in a hammer mill, and then tested. The pH of the slurry was determined with a glass electrode pH meter just before feeding to the rolls. The fluidity of the finished, dried and ground product was determined in the conventional manner as described, for example, on page 133 in the book, "Chemistry and Industry of Starch," by Ralph W. Kerr, 2d. edition, New York, 1950. The filtrate was determined in the manner prescribed by the field testing code of the American Petroleum Institute, using a three inch diameter filter cell operated at 100 pounds per square inch at room temperature. One gram of the ground starch or flour product was dispersed in 100 ccs. of a saturated salt mud containing a Attapulgite type clay. The filtrate values shown are the cubic centimeters issuing between the first and the fourteenth minute of filtration, times 2, this figure giving substantially the A. P. I. thirty-minute value.

In all of the cases above, sticking was experienced with the starches or flours where urea had not been used, namely, tests Nos. 1, 6 and 8. The sticking was worst with the tapioca and least, but appreciable, with the corn flour. In all cases, the addition of from 50 to 250 grams, as the case may be, of urea to the batch resulted in substantial freedom from stickiness on the rolls.

It will be observed that in all cases, where amounts of urea within the scope of this invention were added, an improvement was had in the filtration characteristics imparted by the starch. Also, at the same time, the fluidity decreases. The results of adding too much urea are shown, incipiently, by test No. 3, in which 2.5 percent of urea based on the flour was used, and which resulted in both the fluidity and filtrate rising from the minimum shown in test No. 2, where approximately 1.4% of urea was used. Still greater concentrations of urea would, of course, increase the filtrate even more. It will be appreciated that in this test the starch has already been subjected to a thin-boiling modification as a result of the acidification, so that it appears that small amounts of urea act to reverse this modification in part, while still lowering filter loss, but larger amounts enhance it, an effect which could not be predicted at all from the art.

The invention may be applied in many ways. For example, modification of the starch to cause it to become thin boiling can be carried out well ahead of pregelatinization, and the modifying chemical or chemicals added can be neutralized or removed before the gelatinization process. Likewise, the invention can be applied to starches and flours which are not modified to make them thin boiling although this generally results in a product which is inferior for drilling mud purposes, particularly when used in salty muds. Naturally, also, changes well within the scope of the invention may be made by altering the cooking and drying process; for example, the cooking may take place first and the drying later, and the latter may be, for example, on a single large roll with a small roll instead of two rolls of equal size. The invention is applicable wherever difficulty is encountered in the starch product sticking to heated metal surfaces, and is even applicable in some types of spray dryers. It is not necessary to make any attempt to remove the urea from the finished product, as it has no deleterious effect upon the mud properties and indeed is present in the starch at a quite low concentration.

Having described the invention, I claim:

1. The process of preparing a starchy filter loss reducing additive for drilling muds comprising, adding urea to a slurry the major constituents of which are water and a substance chosen from the class of starch and starchy flours in an amount equal to from 0.2 to 2.0 percent of urea by weight of said starchy substance, heating the slurry to a temperature at least as high as the gelatinization temperature of the starch contained therein, and drying the heated slurry for at least part of the time in contact with a heated metal surface.

2. The process of preparing a starchy filter loss reducing additive for drilling muds comprising, adding urea to a slurry the major constituents of which are water and a substance chosen from the class of thin-boiling starches and thin-boiling flours in an amount equal to from 0.2 to 2.0 percent of urea by weight of said starchy substance, heating the slurry to a temperature at least as high as the gelatinization temperature of the starch contained therein, and drying the heated slurry for at least part of the time in contact with a heated metal surface.

3. The process of preparing a starchy filter loss reducing additive for drilling muds comprising, adding a thin-boiling modification agent in an amount sufficient to increase substantially the fluidity of the product upon heating and drying to a slurry the major constituents of which are water and a substance chosen from the class consisting of starches and starchy flours, adding urea to said slurry in an amount of between 0.2 and 2.0 percent of urea by weight of the starchy substance contained therein, heating the slurry to a temperature at least as high as the gelatinization temperature of the starch contained therein, and drying the heated slurry for at least part of the time in contact with a heated metal surface.

References Cited in the file of this patent

UNITED STATES PATENTS

| 2,417,307 | Larsen | Mar. 11, 1947 |
| 2,561,418 | Ryan | July 24, 1951 |
| 2,579,453 | Post et al. | Dec. 25, 1951 |